United States Patent [19]
Dondero

[11] Patent Number: 5,870,357
[45] Date of Patent: Feb. 9, 1999

[54] MULTIDISK CD-STORAGE, RETRIEVAL, AND PLAYBACK SYSTEM INCLUDING AN ELEVATOR SYSTEM HAVING A GRIPPER AND FRONT AND REAR PUSHERS

[75] Inventor: Paul Dondero, Bradford, Mass.

[73] Assignee: CDLogic, Inc., Plaistow, N.H.

[21] Appl. No.: 662,464

[22] Filed: Jun. 10, 1996

[51] Int. Cl.⁶ .................................................. G11B 17/18
[52] U.S. Cl. ............................................. 369/36; 369/178
[58] Field of Search .............................. 369/36, 34, 178, 369/191, 192; 360/92, 98.04, 99.02, 99.06

[56] References Cited

U.S. PATENT DOCUMENTS

| | | | |
|---|---|---|---|
| 4,811,318 | 3/1989 | Laufer | 369/36 |
| 5,056,073 | 10/1991 | Fitzgerald et al. | 369/36 |
| 5,274,620 | 12/1993 | Sipos | 369/36 X |
| 5,335,218 | 8/1994 | Osada | 369/178 |

*Primary Examiner*—William R. Korzuch
*Attorney, Agent, or Firm*—Mark P. White

[57] ABSTRACT

A multidisk CD storage, retrieval, and playback system and process of operation is described. The system contains a storage magazine containing a multiplicity of disks, typically 75 or more, and interfaces with a standard CD record and playback transport. The system further contains an elevator system which traverses the magazine, allowing the insertion or removal of a CD in the magazine, or, alternatively the elevator allows the insertion or removal of the CD into the CD record and playback transport. The system interfaces with a personal computer, which supplies the command and control signals which synchronize the operation of the system.

11 Claims, 11 Drawing Sheets

MULTIDISK CD-STORAGE, RETRIEVAL, AND PLAYBACK SYSTEM INCLUDING AN ELEVATOR SYSTEM HAVING A GRIPPER AND FRONT AND REAR PUSHERS

BACKGROUND OF THE INVENTION

FIELD OF THE INVENTION

DESCRIPTION RELATIVE TO THE PRIOR ART

The present invention relates to a mechanism for the automatic storage and retrieval of a multiplicity of compact disks (CD's) into a multi-disk storage unit. This invention further relates to the loading of CD's into a compact disk player, and the retrieval of CD's from said compact disk player.

The compact disc has become popular in recent years as a means for the storage and playback of music, as well as for the storage and playback of digital data for use by computer systems, especially personal computers (PC's).

As a music medium the compact disc offers unparalleled fidelity of reproduction, with accompanying resistance to degradation which, in earlier types of recording media, were caused by wear during playback, scratching of the medium, and the like. Furthermore the CD provides more playback time in a smaller configuration than did earlier vinyl disks and magnetic tapes.

The CD is also a widely-used medium for storage of digital data for PC's, since it provides significantly more storage capacity than other off-line storage media, such as floppy disks. As a comparison, the current digital CD stores in the order of 650 megabytes, whereas the standard four and one-half-inch floppy disk has a capacity of about 1.44 megabytes.

Data CD's also are used in multi-media applications; that is, both graphics, sound, and digital data are stored on the same CD. PC's equipped with sound cards are capable of playing back such multi-media disks, as well as CD's containing only sound recordings.

As the CD has become universally acceptable, it has become desirable to provide devices which can store and retrieve CD's from a magazine of CD's. Automatic storage and retrieval is desirable for several reasons: first, it minimizes the handling of the CD. CD's remain susceptible to scratching and dirt, albeit to a lesser extent than other recording media. Secondly, automatic storage and retrieval does away with the problem of manually filing the CD's and then attempting to locate the CD required. Thirdly, the automatic system can, if properly designed, minimize the amount of space required to store the CD's. And finally, the use of multi-CD data sets can be easily accommodated.

Storage and retrieval systems for recording disks are well known, especially the "juke-box" type used for vinyl disks for the playback of music recordings. Typical of these systems is the invention of Hagen, U.S. Pat. No. 3,131,936.

In recent years a number of multi-disk playback systems have become commercially available, especially music CD playback systems. These are of several types. First are the multi-magazine CD players, in which the user manually loads a magazine with CD's and then inserts the magazine into a transport designed to receive the magazine and select a disk therefrom. U.S. Pat. No. 5,034,935, Ishibashi et al., describes such a system, as does U.S. Pat. No. 5,099,466, Kimura et al, as well as U.S. Pat. No. 4,701,900, Hasegawa et al.

Another common type has a fixed magazine which is loaded by the user. Typical of this second type are U.S. Pat. Nos. 4,695,990, Kawakami, 4,949,328, Kase et al., and 4,614,474, Sudo. This inventions of the second type are generally suited mainly to music CD's and are self-contained, intended to be interconnected to a hi-fi music system or automobile music system.

The current invention provides a unique approach to a multi-CD system. First of all, this invention provides a compact system which allows for the storage of 75 or more CD's within a minimum space configuration, a number far in excess of the capabilities of most of the aforementioned systems. Secondly, this invention does not contain its own CD record/playback system, but can be used in conjunction with almost any standard, single-disk CD-ROM unit, and it is not confined to playback systems alone, but may be used to provide a multi-disk recording/playback system as well. Thirdly, the current invention is intended primarily for use in conjunction with a personal computer, especially a networked PC, so that software provided as part of this invention and resident on the PC is an integral part of the control system of the invention. The software provides a comprehensive system for the organization of the CD's within the system, allowing for automatic selection of storage locations, automatic generation and management of directories of the stored CD's, and for automatic retrieval of CD's from the system using these directories.

SUMMARY OF THE INVENTION

It is an object of the present invention to provide an inexpensive system for storing a multiplicity of CD's in a compact magazine whereby a selected CD may be transported to a Media drive for recording and/or playback.

It is a further object of the present invention to provide said system in conjunction with a software system which organizes the CD's within the system by title. More specifically, it is an object of the invention to achieve a system by which the user may:

introduce a CD into the system through a single Entrance Port;
 input identifying title information of the CD;
 automatically store the CD in an available location within the magazine under computer control;
 automatically retrieve the CD from its storage location and record and/or playback the CD; and
 remove the CD from the system though the single Entrance Port.

According to one aspect of the invention, a drive system for inputting, storing, retrieving, and playing a multiplicity of compact disks, used in conjunction with a Media drive and with a stored-program computer is disclosed. The system comprises a magazine containing a multiplicity of slots, each of which is capable of storing a CD, an elevator system in proximity to the magazine which can be controllably translated to access each slot of the magazine, a gripper affixed to the elevator system which can controllably grip or release a CD, means for introducing the CD into the gripper, a pilot latch affixed to the gripper which can controllably lock the CD in place within the gripper or release the CD, a front pusher affixed to the elevator system which can controllably push the CD from the gripper into a slot in the magazine, a rear pusher affixed to the elevator system which can controllably push the CD from a slot in the magazine into the gripper, a computer program which controls the operations and the sequence of operations of the elements of the drive system, and an electronic subsystem located in proximity to the drive system which converts the signals from the computer into signals to control the elements of the drive system.

According to another aspect of the invention the computer program identifies the CD's with unique identification title information and retains a map correlating each CD with a corresponding slot in which the CD is stored. The user is provided with means by which he may control the insertion or removal of a CD in a specified slot by means of said title information.

According to yet another aspect of the invention, the computer program comprises a number of steps, in order, which comprise requesting a command by the program, inputting an IMPORT command by the user, selecting the next available storage slot by the program by means of searching the location map, requesting the user for a title for the CD by the program, inputting a title by the user, checking by the computer that the latching mechanism is in the unlatch position, driving the elevator mechanism to the top of its travel until the front gripper mechanism reaches its LOAD position adjacent to the input port, inserting the CD into the Entrance Port by the user, drawing the CD into the Entrance Port by the friction rollers until it reaches the "IN" position, pushing the CD into the gripper which then supports the CD by its edges, closing the pilot latch into its latch position, holding the CD firmly in place thereby, descending the elevator mechanism until the gripper aligns with the selected storage slot in the magazine, releasing the pilot latch, and pushing the CD into the magazine by means of the front pusher arm.

According to still another aspect of the invention, the computer program comprises another sequence of similar steps in which a CD may be located directly into the Media drive in a fashion similar to loading the CD into a storage slot.

According to another aspect of the invention, the computer program comprises a third sequence of similar steps in which a CD may be removed from a storage slot, physically expelled from the system, and expunged from the system program.

According to a final aspect of the invention, the computer program comprises a fourth sequence of similar steps in which a CD may be removed directly from the Media drive, physically expelled from the system, and expunged from the system program.

BRIEF DESCRIPTION OF THE DRAWINGS

These, and further features of the invention, may be better understood with reference to the accompanying specification and drawings depicting the preferred embodiment, in which.

DETAILED DESCRIPTION OF THE PREFERRED EMBODIMENTS

In the preferred embodiment the apparatus is built into a cabinet which comprises walls of sheet metal or plastic supported by an internal chassis. The cabinet and chassis structure are not part of the invention, and so will not be described in any detail.

Figure 1:
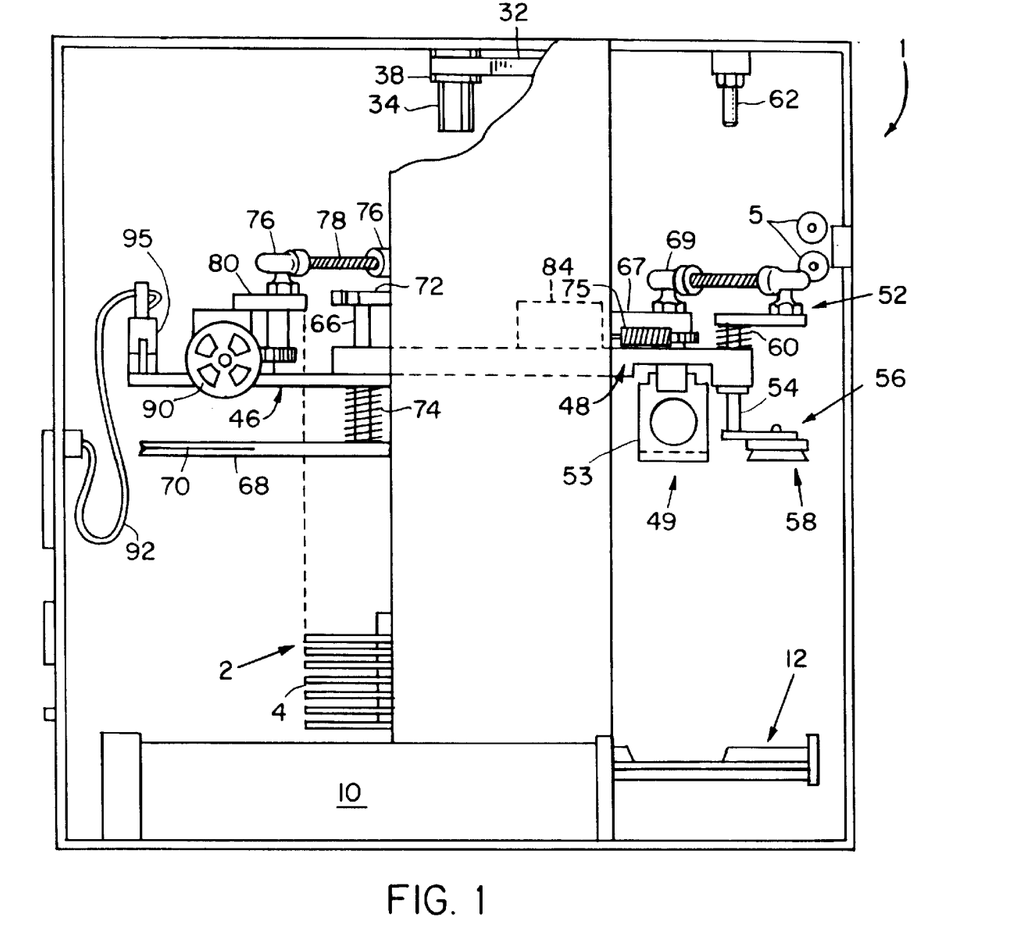
FIG. 1 depicts the transport in cut-away view as viewed from the left side.

The invention is shown from the left side of the cabinet in FIG. 1. In FIG. 1, the front 1 of the apparatus is to the right of the figure, and the back of the apparatus to the left-hand side.

Figure 3:
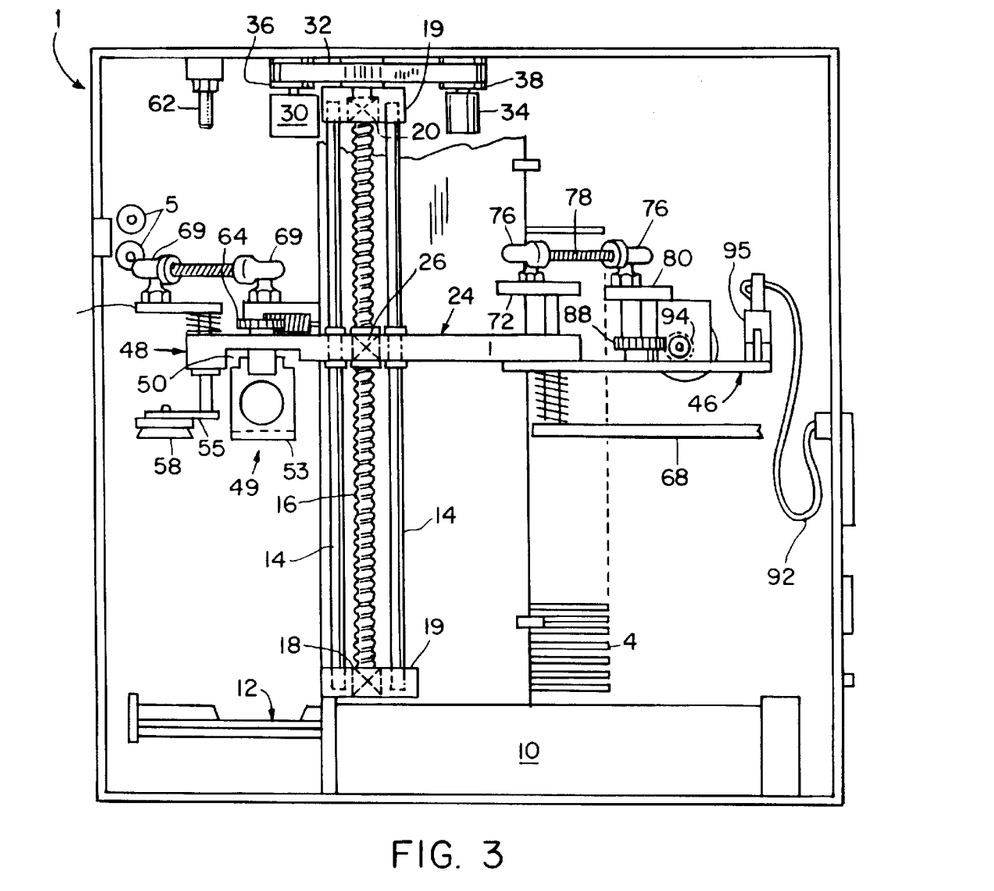
FIG. 3 depicts the transport in cut-away view as viewed from the right side.

As shown in FIG. 1, the invention comprises a magazine in the form of a storage rack 2, a tower-like structure in which the CD's are stacked when not in use, and which occupies the central portion of the apparatus. The storage rack extends from the top of the Media drive, 10 nearly to the top of the cabinet. The Media drive may be any of a number of commercially available devices that record and/or playback CD's. FIG. 3 shows the storage rack from the opposite side of the cabinet. Although the views of FIGS. 1 and 3 show only a few CD's 4 inserted into the storage rack for the sake of clarity of the drawing, in practice the rack may be full of CD's from top to bottom.

Figure 2A:
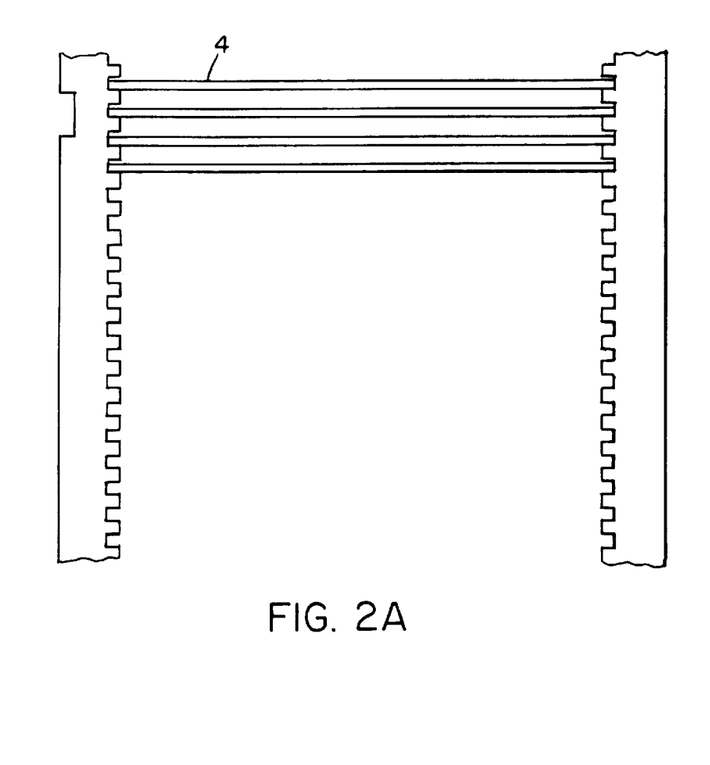
FIG. 2a depicts the storage rack as viewed from the front.
Figure 2B:
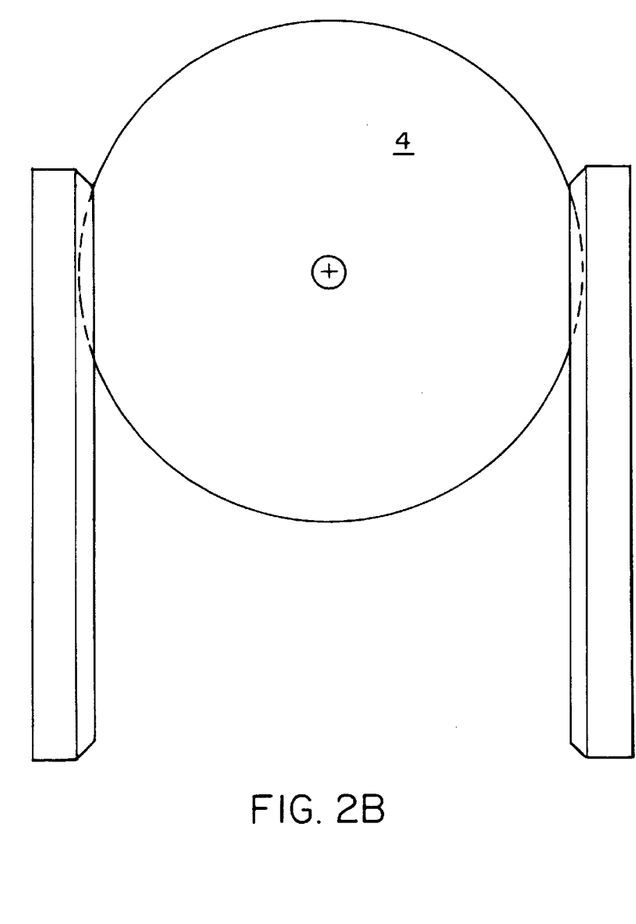
FIG. 2b depicts the storage rack as viewed from the top, with a CD partially inserted.

As seen in FIG. 2A, The storage rack comprises two identical sides 7 whose dimensions are 9.375 inches by 0.375 inches thick by 4.75 inches wide. Each side contains regular grooves 6 with an approximate depth of $3/16$ inches and a width of $1/16$ inches to accommodate the thickness of the standard CD. The distance between grooves is approximately equal to the groove width. In the preferred embodiment the storage rack contains 75 grooves, sufficient for 75 CD's. Based on a groove width of $1/16$ inches, the storage rack of the preferred embodiment is 9.5 inches in height. An inserted CD 8 of standard size (4.750 inches in diameter) will be completely supported by the grooves when fully inserted into the storage rack, as shown in FIG. 2B, as viewed from the top of the storage rack. Each set of two grooves into which a CD may be inserted is called a slot.

Figure 5:
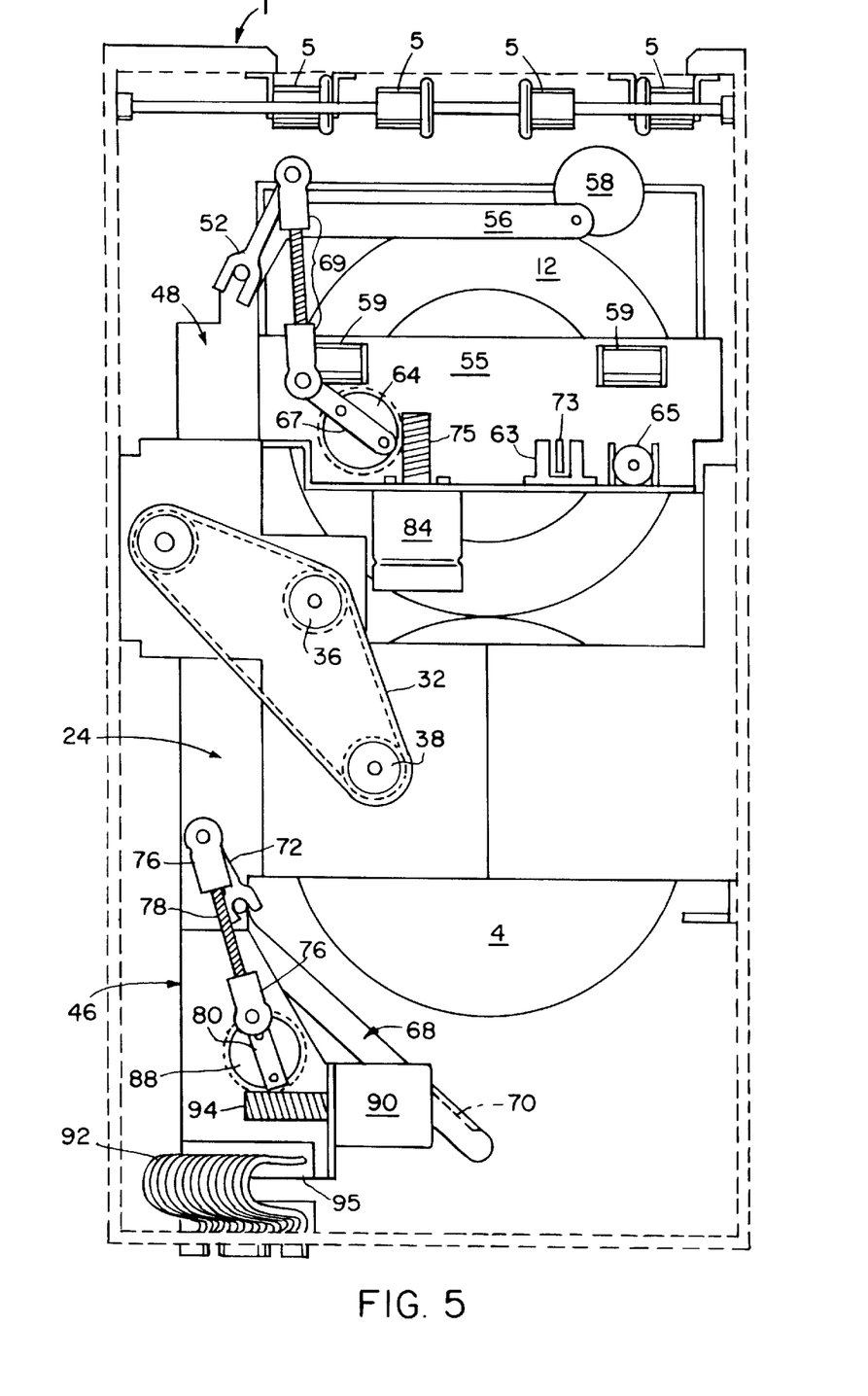
FIG. 5 depicts the transport in cut-away view as viewed from the top.

Referring again to FIG. 1, the CD's are inserted into the port 3 from the front of the apparatus. The storage rack sits atop the Media drive 10, oriented so that the Media drive tray, 12 is not obstructed by the storage rack. Insertion of the CD's into the system is facilitated by means of upper and lower friction rollers 5, as shown in FIGS. 1, 3 and 5. These friction rollers are located just to the rear of the CD port 3, and rotate when a CD is sensed in the vicinity of the port and when the front pusher mechanism is also in its load position adjacent to the port, so that a CD partially inserted into the port will be drawn into the apparatus and thence into the gripper assembly.

The input thus described proceeds in three steps: first, the CD is placed into the port just far enough so that it contracts the friction rollers, and also is detected by the input opto detector. From this first, or "INPUT POSITION", the CD is drawn by the friction rollers into the "IN POSITION", whereby the CD is adjacent to the gripper, but not yet fully inserted into the gripper. Finally the front pusher pushes the CD from the "IN POSITION" fully into the gripper.

FIG. 3 shows the apparatus from the side opposite the view for FIG. 1, with the cabinet front 1 to the left of the figure, and the cabinet back to the right. FIG. 3 shows the elevator mechanism, comprising two identical elevator slides 14 on either side of the lead screw 16. The lead screw is supported by a lower bearing 18 and an upper bearing 20. Both bearings are seated in pillow blocks 19 which support the slides as well as the bearings.

Referring again to FIG. 3, the main motion plate 24 rides up and down in concert with the lead screw 16. The main motion plate contains a captured ball nut 26 which converts the rotary motion of the lead screw into a transitional motion of the main motion plate. The lead screw is in turn driven by the elevator stepper motor 30 by means of toothed drive belt 32. A shaft encoder 34 is also driven by the same toothed drive belt so that a rotation (alpha) of the stepper motor 30 will cause a rotation (beta) of the shaft encoder 34. The ratio of the rotations $$(alpha)/(beta)=(k)$$

is determined by the ratio of diameter of the stepper motor gear 36 mounted on the stepper motor shaft to the diameter of the shaft encoder gear 38 mounted on the shaft encoder shaft. The gear and belt mechanism is shown from the top in FIG. 5, which also discloses the lead screw gear 28.

Figure 4:
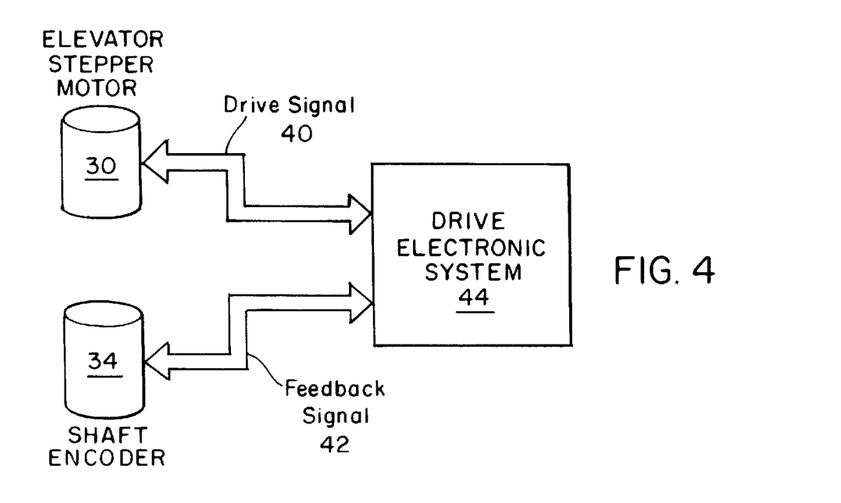
FIG. 4 depicts the electrical interconnections between the elevator stepper motor, the shaft encoder, and the drive electronics.

FIG. 4 shows the electronic connections of the stepper motor and shaft encoder. The stepper motor is driven by a drive signal 40 generated by the drive electronic system 44, causing the motor to rotate. The shaft encoder produces a feedback signal 42 which is fed back into the drive electronic system 44. The drive electronic system uses the shaft encoder feedback to both accurately rotate the lead screw to its desired position, and to control the drive speed and acceleration so as to provide maximum performance of the drive system.

Figure 6:
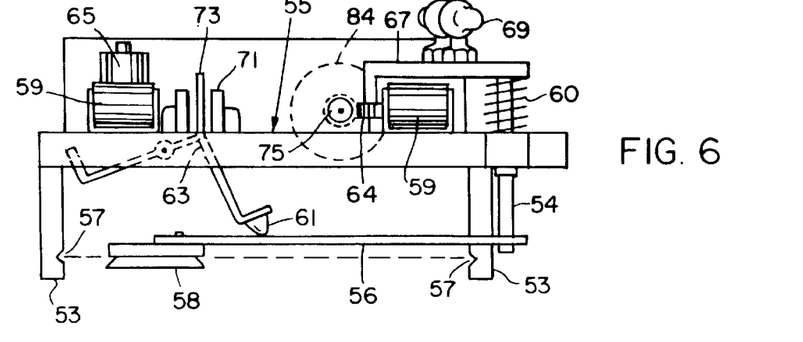
FIG. 6 depicts the gripper mechanism as viewed from the front.
Figure 7:
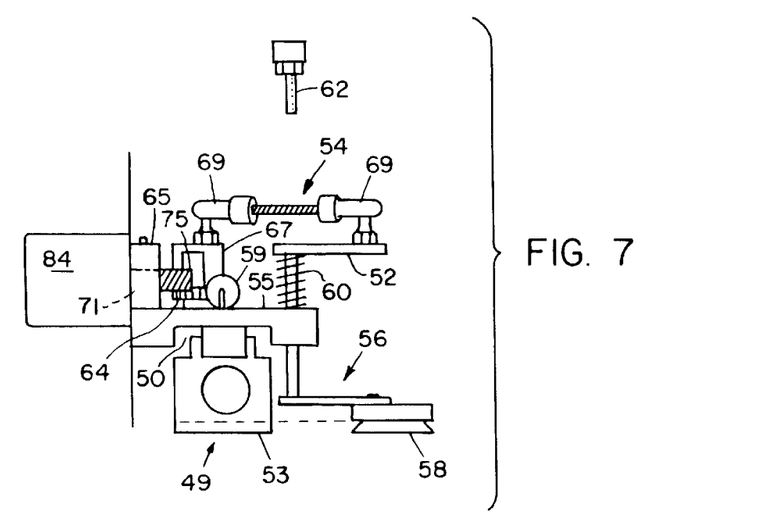
FIG. 7 depicts the front pusher assembly as viewed from the left side.

Referring again to FIG. 3, the main motion plate comprises a rear pusher plate 46 and a front pusher plate 48, located toward the rear and the front of the cabinet, respectively. FIG. 6 shows the detail of the front pusher plate as viewed from the front, and FIG. 7 shows the plate from the left side. The front pusher plate contains the front pusher assembly used to push the selected CD into the storage rack when required.

Figure 8:
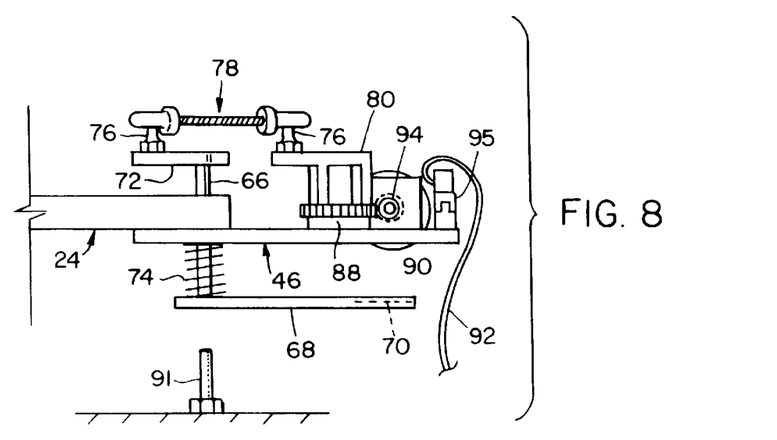
FIG. 8 depicts the rear pusher assembly as viewed from the right side.

FIG. 8 shows detail of the rear pusher plate, which contains the rear pusher assembly used to push the selected CD out of the storage rack and into the gripper assembly 49.

Referring now to FIG. 7, the front pusher plate contains a groove 50 into which the gripper assembly fits. The gripper assembly, shown in FIG. 6 viewed from the cabinet front, comprises two gripper cheeks 53 rotatably mounted on the gripper top plate 55. The gripper cheeks contain gripper grooves 57 which grip a CD on either side during operation of the device. As seen in FIG. 6 the gripper assembly further comprises two gripper solenoids 59 which, when activated by means of an electric current, draw the gripper cheeks apart, allowing the CD to be either inserted or released into the gripper. When the solenoid is deactivated the cheeks, which are spring biased in the closed position, come together, holding the CD within. The front gripper assembly further comprises a pilot latching mechanism which contains a pilot latch center guide 61 rigidly attached to the pilot latch arm 63 which rotates about an axis normal to the front of the cabinet, and which swings either down to engage the center hole of the CD, or up to disengage the center hole. In the engaged position, the center guide holds the CD in a precise position whilst the CD is held within the gripper cheeks. The pilot latch is spring-loaded into the down, or locked position, and is activated by the pilot latch solenoid 65, which swings the pilot latch up into the unlock position. The limit of the pilot latch swing is sensed by the pilot latch opto sensor 71, which senses the presence of the pilot latch flag 73 between the optical source and the optical detector located within the opto sensor. The pilot latch flag is a metal tab rigidly attached to the latch arm.

When the latch is in its locked position, the CD is held firmly within the gripper mechanism. The opto-sensing process acts as a safety measure, detecting that the activation of the latching solenoid has been successful in unlatching the pilot latch, so that the device will not attempt to push the CD out of the gripper mechanism while the latch still restrains the CD within the gripper.

Referring to FIGS. 1 and 5, the front pusher assembly comprises the front pusher crank arm 52, the front pusher shaft 54, the front pusher arm 56, and the front pusher pin 58. Referring to FIG. 5 the front pusher pin 58 is eccentrically mounted rigidly to the front pusher arm. The crank arm comprises a yoke-like bifurcated structure at its end into which the front linkage arm 54 attaches. The front pusher crank arm is driven by the front crank arm motor 84, through the front crank-arm worm 75, which in turn drives the front crank arm gear 64. Mounted on the front crank arm gear and rigidly attached thereto is the front pi-member 67, to which the front linkage arm 54 is attached at one end. The front linkage arm is rotatably engaged with the front pusher crank and with the front pi-member via ball joints 69. Upon activation of the front pusher motor the rotational motion of said motor is converted into a reciprocating motion by means of the front pusher mechanism just described. The front pusher arm, containing the front pusher pin, will thus be moved first toward the storage rack and then away from the storage rack as the front pusher motor continues to turn. The extent of the motion is a function of the geometries of the various elements just described. The front pusher opto sensor (not shown) provides an electrical feedback when the front pusher arm has reached the "home" or fully retracted position. The mechanism of the front opto sensor is identical to that of the other opto sensors; a metal flag attached to the front crank arm interrupts the optical signal of the opto sensor, thus creating an electrical signal to indicate the presence of the flag between the two parts of the sensor. This opto sensor serves as a limit stop sensor for the front pusher mechanism. It also serves as a calibration point, since the innermost limit of the front pusher arm travel is half-way between limit stops.

Whenever the front pusher is activated in order to push the CD from the front gripper into the storage rack the pusher makes a complete cycle, which begins when the pusher arm moves sufficiently so that the flag moves out of the opto sensor and continues as the pusher arm moves to a position closest to the storage rack, then moves away, and finally returns to the "home" position once again.

FIGS. 6 and 7 also disclose the front pusher spring 60 which allows the front pusher assembly to remain in a preset position with respect to the front pusher plate, but to slide up and down along the axis of the front pusher shaft when sufficient force is applied along the axis of said shaft. FIG. 9 depicts the condition whereby the main motion plate is near the top of its travel, and the front pusher dead stop 62 engages the front pusher crank arm 52, thus moving the front pusher pin down and out of the way of the storage rack and the stored CD's.

Referring now to FIG. 8, the rear pusher plate 46, together with the proximate portion of the main motion plate 24, supports a mechanism to actuate the rear pusher arm which is similar to the mechanism which actuates the front pusher arm. The rear pusher mechanism comprises the rear pusher crank arm 72, the rear pusher shaft 66, and the rear pusher arm 68. There is no rear pusher pin, but rather, the rear pusher arm itself contains a groove, 70, which engages the CD when required. The rear pusher arm must fit between the grooves of the storage rack, and so may not contain an enlarged pin as does the front pusher arm. The rear pusher crank arm, 72, like the front pusher crank arm, comprises a yoke-like bifurcated structure at its end into which the rear crank arm ball joint 76 attaches. A rear pusher spring 74, maintains the rear pusher arm in a preset position, but at the bottom of its travel allows the rear pusher arm 68 to be displaced up and out of the way of the Media drive 10 when it engages the lower limit stop 91. The operation of the lower limit stop is identical to that of the upper limit stop 62, as depicted in FIG. 9.

The rear pusher shaft 66 extends vertically through the rear end of the main motion plate 24 and the rear motion plate 66 as seen in FIG. 8. The rear pusher crank arm 72 is connected via linkage arm 78 to the rear pi-member 80. The linkage arm is rotatably engaged with the rear pusher crank and with the rear pi-member via ball joints 76.

Referring still to FIG. 8, the rear pi-member 80 is rigidly mounted to the rear pusher gear 88, which is rotatably mounted on the rear pusher plate. The rear pusher gear is driven by the rear pusher worm 94 which mounts at right angles to the rear pusher gear, and which is mounted on shaft 86, driven by rear pusher motor 90.

Power is supplied to the front and rear pusher motors via motion cable 92, attached via connector 95. Referring again to FIG. 3, it is seen that motion cable 92, in the form of a ribbon cable, aligns itself against the rear of the cabinet, and moves up and down with the main motion plate.

FIG. 5 shows a top view of the rear pusher plate 46, showing the rear pusher motor 90, rear pusher gear 88, and rear motor worm 94. Like the front pusher mechanism, the rear pusher mechanism converts the rotational motion of the rear pusher motor into a reciprocating motion which is sensed at its limits by the rear pusher opto sensor (not shown).

The rear pusher system, like the front pusher system, can detect only the "home" position, or fully retracted position, when the flag attached to the rear pusher arm interrupts the optical signal in the opto sensor. Like the front pusher system, the rear pusher, when activated, completes a full cycle, moving the rear pusher arm first toward the storage rack and then away, until the opto sensor again detects the presents of the flag.

Figures 9A, 9B:
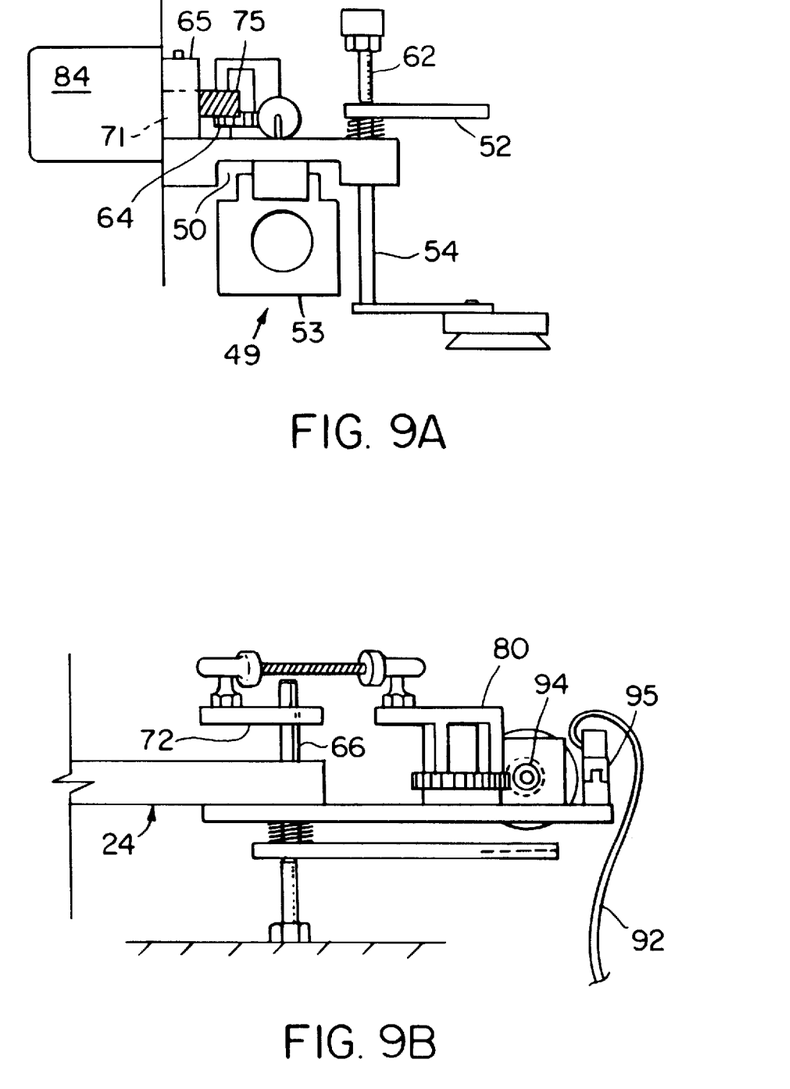
FIG. 9A depicts the front pusher mechanism at one extreme of its travel.
FIG. 9B depicts the rear pusher mechanism at one extreme of its travel.

Referring now to FIG. 9B, it is seen that, like the front pusher mechanism, the rear pusher mechanism also utilizes a spring-loaded shaft 66 to allow the rear pusher arm to clear the Media drive when the elevator mechanism is near the bottom of its travel.

FIG. 9B depicts the condition whereby the rear pusher dead stop 91 engages the rear pusher arm 68, thus moving the rear pusher arm up and out of the way of the Media drive.

The main motion system also contains an opto sensor which sense when the elevator mechanism is at the top and bottom of its allowed motion. In addition there is a third opto sensor activated by the motion system. This third opto sensor is the "home", or "orientation" sensor or detector. These opto sensors work identically to the sensors previously described.

The top and bottom limit detectors serve as limit stop detectors to allow the system to detect when the limits of travel are being reached. However, the orientation sensor serves a calibration function. When the orientation sensor is activated, the control program establishes a reference point from which all other positions are calculated. The position calculation is done by counting the pulses generated by the shaft encoder as it rotates, and adding (or subtracting) a number equal to $$d = d_0 + n*\Delta p$$

where d is the absolute position along the path of the elevator $d_0$ is the absolute position of the orientation sensor n is the number of shaft encoder pulses counted since the orientation signal ceased, and $\Delta p$ is the pitch equal to the distance moved by the elevator for every encoder pulse.

In operation, the apparatus steps through a number of discrete Operation Cycles, depending upon the function to be performed. The Operation Cycles are controlled by the PC to which the current invention is attached, and the control signals are accommodated by means of standard PC cables.

The connections between the computer and the multi-disk transport are two-fold. First of all, the computer drives the Media drive (which transport is not a part of this invention, but which interfaces with the invention) by means of either a standard IDE connection, SCSI connection, or the equivalent. These connections are commonly used with PC's to interconnect CD drives of either the internal or external type.

Figure 10:
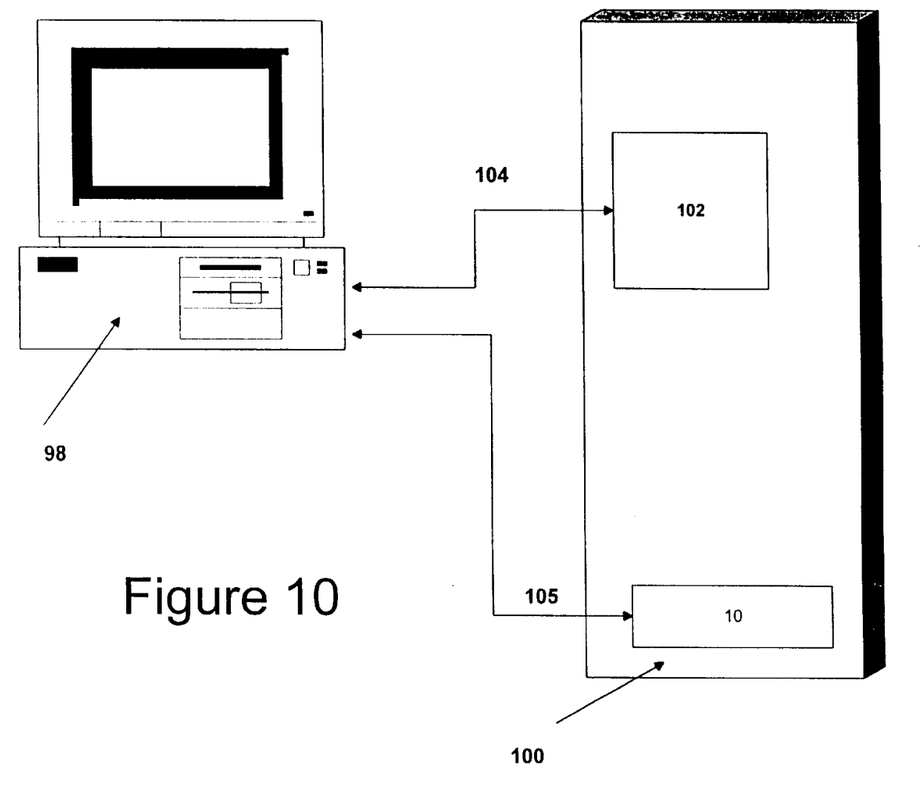
FIG. 10 depicts the electrical connections between the Personal Computer and the interface card located within the cabinet of the multidisk CD storage, retrieval, and playback system.

As revealed in FIG. 10, the electrical connection 105 between the Media drive 10 and the PC 98 is separate from a second of connection 104 from a standard serial or parallel communications port, such as the RS232 standard port, located within the PC 98 to a controller card 102 located within the cabinet of the multidisk transport 100. The controller card coverts the signals originating in the PC into the actual drive signals required to operate the motors, solenoids, and other actuating mechanisms of the multidisk transport. Furthermore, sensors, including the shaft encoder 34 and the various opto sensors which detect limit conditions are converted into a form readable by the PC by means of the controller card 102.

As part of the control program which controls the operation of the Media drive system, there is a CD location map. This CD location map is a table which identifies the CD corresponding to every slot in the storage rack with a human-readable title. The CD location map is dynamic, and is constantly updated as new CD's are added to the storage system or removed therefrom. In addition, the map contains an entry for the Media drive itself, indication whether the transport is occupied or empty, and, if occupied, the identity of the occupying CD.

The first OPERATION CYCLE is IMPORT. IMPORT is the operation which loads a CD from without the apparatus into the storage rack. Closely related to IMPORT is the IMPORT DIRECT, which performs the loading of a CD from without the apparatus directly into the Media drive.

Figure 11:
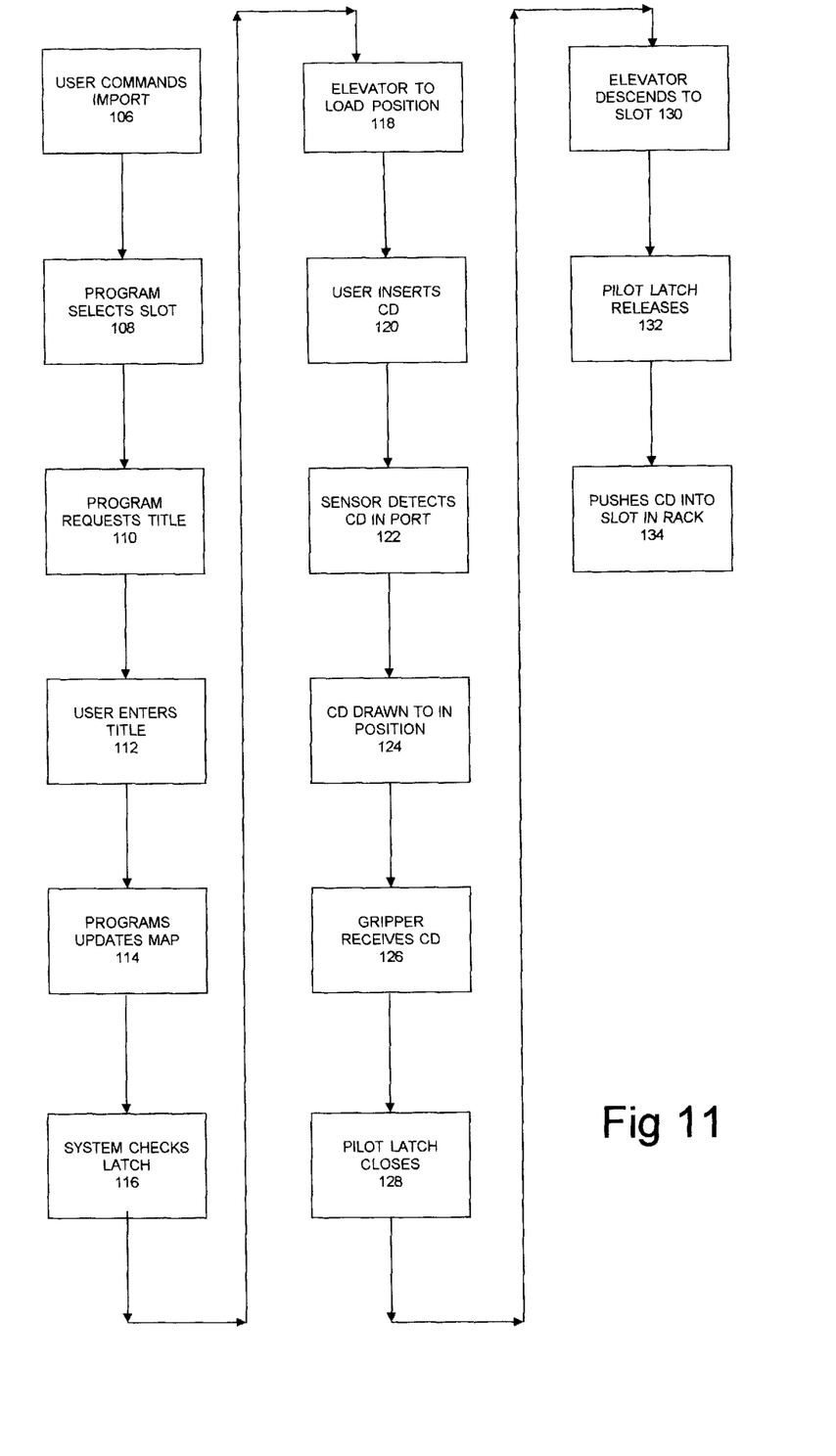
FIG. 11 depicts the flow chart of the operations involved in the IMPORT of a CD into the system.

The sequence of operations for IMPORT is shown by the flow chart of FIG. 11, and functions as follows:

a) The user commands an IMPORT operation from the control program 106.
b) The control program selects the next available storage slot by searching its location map 108.
c) The control program requests the user for a title for the CD 110.
d) The user enters a title 112.
e) The program updates its map 114.
f) The system checks to see that the latching mechanism is in the unlatch position 116.
g) The elevator mechanism moves to the top of its travel until the front gripper mechanism reaches its LOAD position adjacent to the input port 118.
h) The user inserts the CD into the Entrance Port 120.
i) The sensor detects that a CD is in the Port 122.
j) The CD is drawn into the Entrance Port by the friction rollers until it reaches the "IN" position 124.
k) The gripper receives CD, gripping the CD by its edges 126.
l) The pilot latch closes into its latch position, holding the CD firmly in place 128.
m) The gripper descends with the elevator mechanism to the magazine at the selected storage slot 130.
n) The pilot latch releases 132.
o) the front pusher arm pushes the CD into the magazine 134.

Although in other embodiments it is not essential that the steps proceed in exactly the above sequence, it is essential in all embodiments that:

1. the import command is the first step;
2. checking of the latching mechanism precedes movement of the elevator mechanism to the LOAD POSITION;
3. the insertion of the CD into the system, its introduction into the port, its introduction into the gripper, and latching must proceed in the order indicated above;
4. the program must establish where storage space is available before the elevator mechanism descends to the selected storage slot; and
5. the latch mechanism must release before the front pusher pushes the CD into the selected slot.

Figure 12:
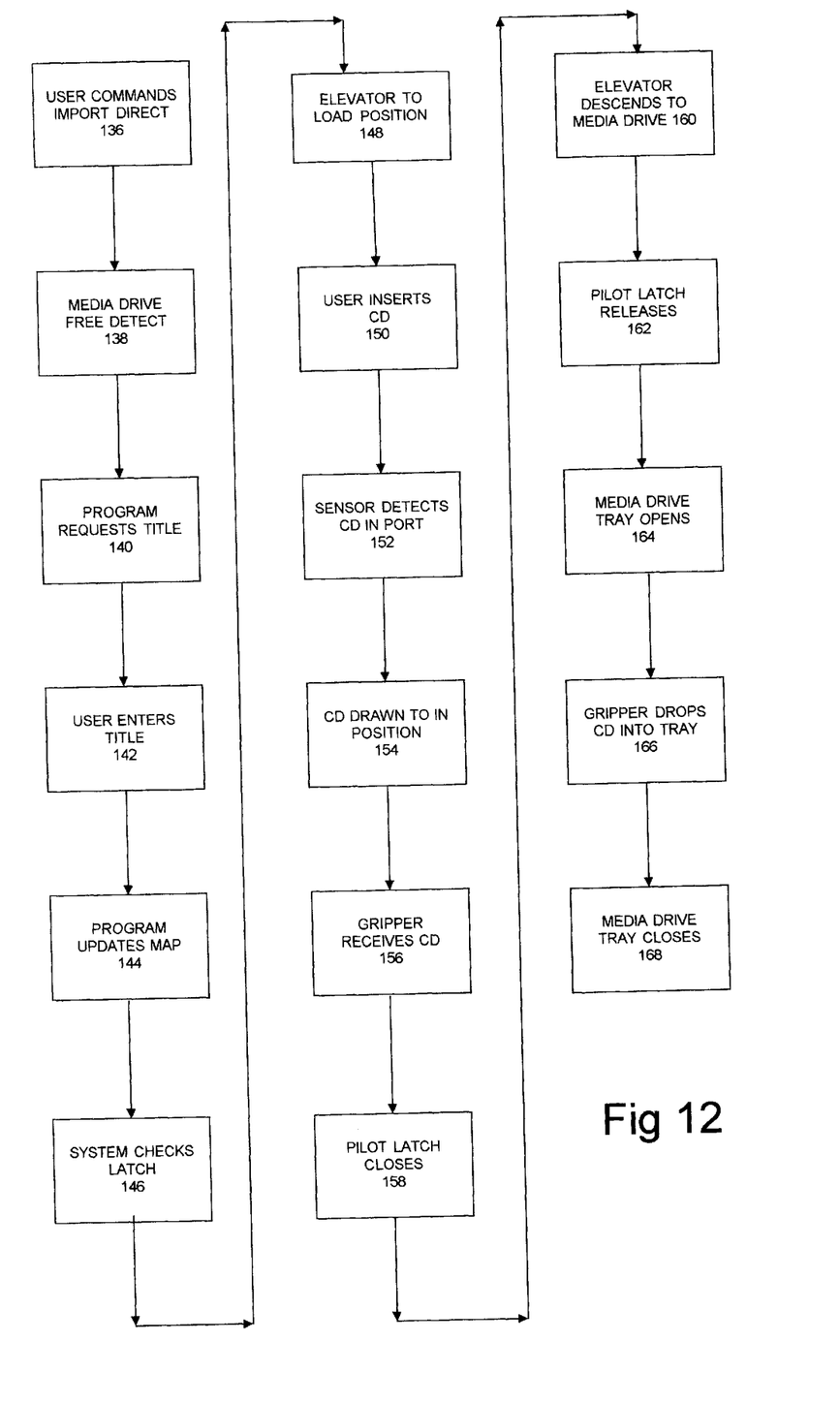
FIG. 12 depicts the flow chart of the operations involved in the IMPORT DIRECT of a CD into the system.

The sequence of operations for IMPORT DIRECT is shown by the flow chart of FIG. 12, and functions as follows:

a) The user commands an IMPORT DIRECT operation from the control program 136.
b) The control program determines that the Media drive is free by searching its location map 138.
c) The control program requests the user for a title for the CD 140.
d) The user enters a title 142.
e) The program updates its map 144.
f) The system checks to see that the latching mechanism is in the unlatch position 146.
g) The elevator mechanism moves to the top of its travel until the front gripper mechanism reaches its LOAD position adjacent to the input port 148.
h) The user inserts the CD into the Entrance Port 150.
i) The sensor detects that a CD is in the Port 152.
j) The CD is drawn into the Entrance Port by the friction rollers until it reaches the "IN" position 154.
k) The gripper receives the CD, gripping the CD by its edges 156.
l) The pilot latch closes into its latch position, holding the CD firmly in place 158.
m) The gripper descends with the elevator mechanism to the level just above the Media drive 160.
n) The pilot latch releases 162.
o) The Media drive tray opens into its "load" position 164.
p) The gripper releases, dropping the CD into the Media drive tray 166.
q) The Media drive tray closes 168.

After which, the CD may be read or written.

As in the case of IMPORT it is not essential that the steps for IMPORT DIRECT proceed in exactly to the above sequence, but it is essential in all embodiments that:

1. the IMPORT DIRECT command is the first step;
2. checking of the latching mechanism precedes movement of the elevator mechanism to the LOAD POSITION;
3. the insertion of the CD into the system, its introduction into the port, its introduction into the gripper, and latching must proceed in the order indicated above;
4. the program must establish that the Media drive is empty before the elevator mechanism descends to the Media drive;
5. the latch mechanism must release before the front pusher pushes the CD into the selected slot.

Similar to the IMPORT and IMPORT DIRECT cycles are the EXPORT and EXPORT DIRECT operation cycles. EXPORT removes a CD from the magazine and ejects it via the port from the system. EXPORT direct removes a CD from the Media drive.

Figure 13:
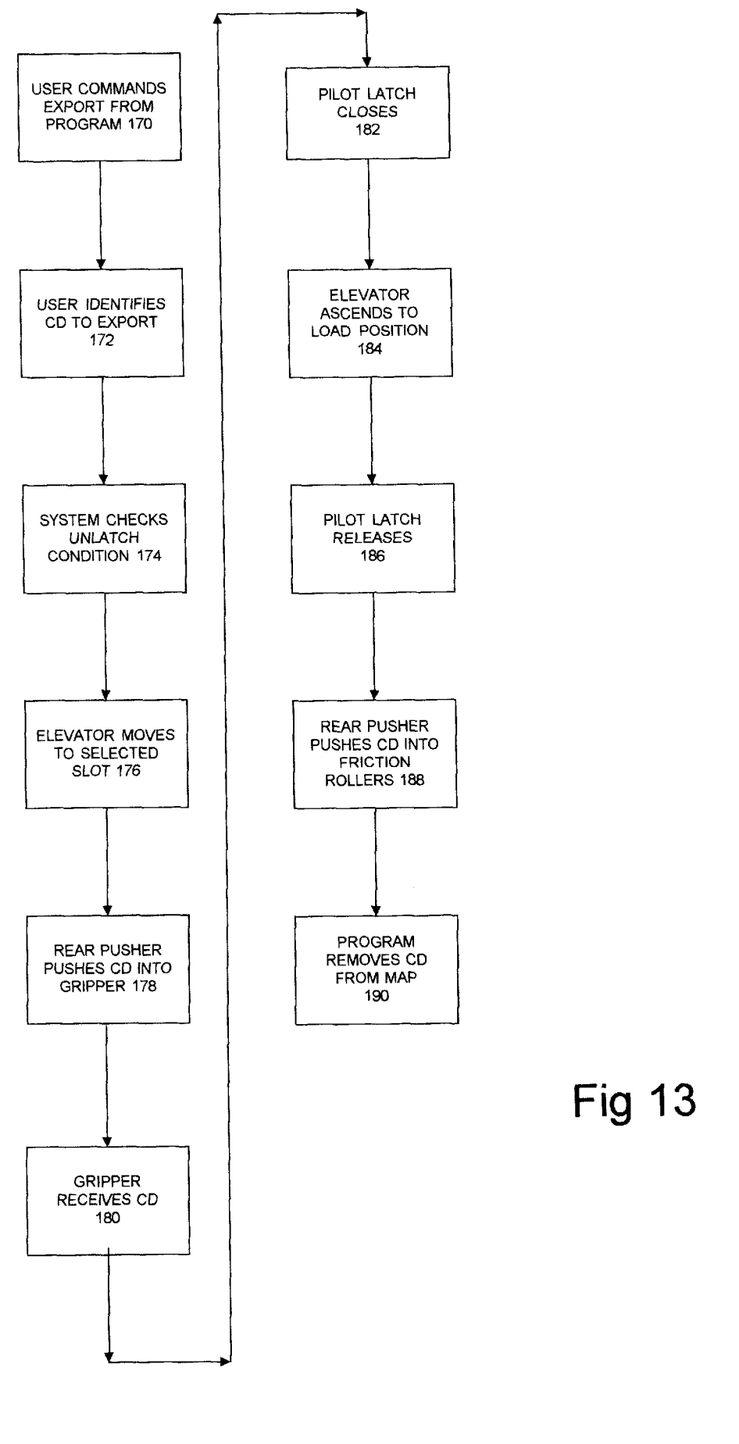
FIG. 13 depicts the flow chart of the operations involved in the EXPORT of a CD from the system.

The sequence of operations for EXPORT is shown by the flow chart of FIG. 13, and functions as follows:

a) The user commands an EXPORT operation from the control program 170.
b) The user indicates the identity of the CD to be exported by means of the control program 172.
c) The system checks to see that the latching mechanism is in the unlatch position 174.
d) The elevator mechanism moves until the front gripper mechanism reaches a position adjacent to the CD to be exported 176.
e) The rear pusher mechanism pushes the CD out of the magazine and into the gripper 178.
f) The gripper receives the CD, gripping the CD by its edges 180.
g) The pilot latch closes into its latch position, holding the CD firmly in place 182.
h) The gripper ascends with the elevator mechanism to the level of the LOAD position adjacent to the port 184.
i) The pilot latch releases 186.
j) The rear pusher mechanism pushes the CD out of the gripper and into the friction rollers, which expel the CD into the port 188.
k) The control program removes the CD from the location map, and marks the location available 190.

From the port, the user may then remove the CD manually.

Again, the sequence steps of alternative embodiments of EXPORT need not conform exactly to those indicated above, but the following rules are essential:

1. the export command is the first step;

2. the program request for the title of the CD for export, followed by the user response must proceed before the elevator mechanism moves to the selected storage slot;

3. the checking of the latching mechanism must precede the movement of the elevator mechanism to the selected slot; and 4. the movement of the elevator mechanism to a position adjacent to the selected slot, the pushing of the CD into the gripper, the latching of the pilot latch, the ascent of the elevator mechanism to the LOAD position, and the pushing of the CD out of the gripper into the friction rollers must proceed in the order indicated.

Figure 14:
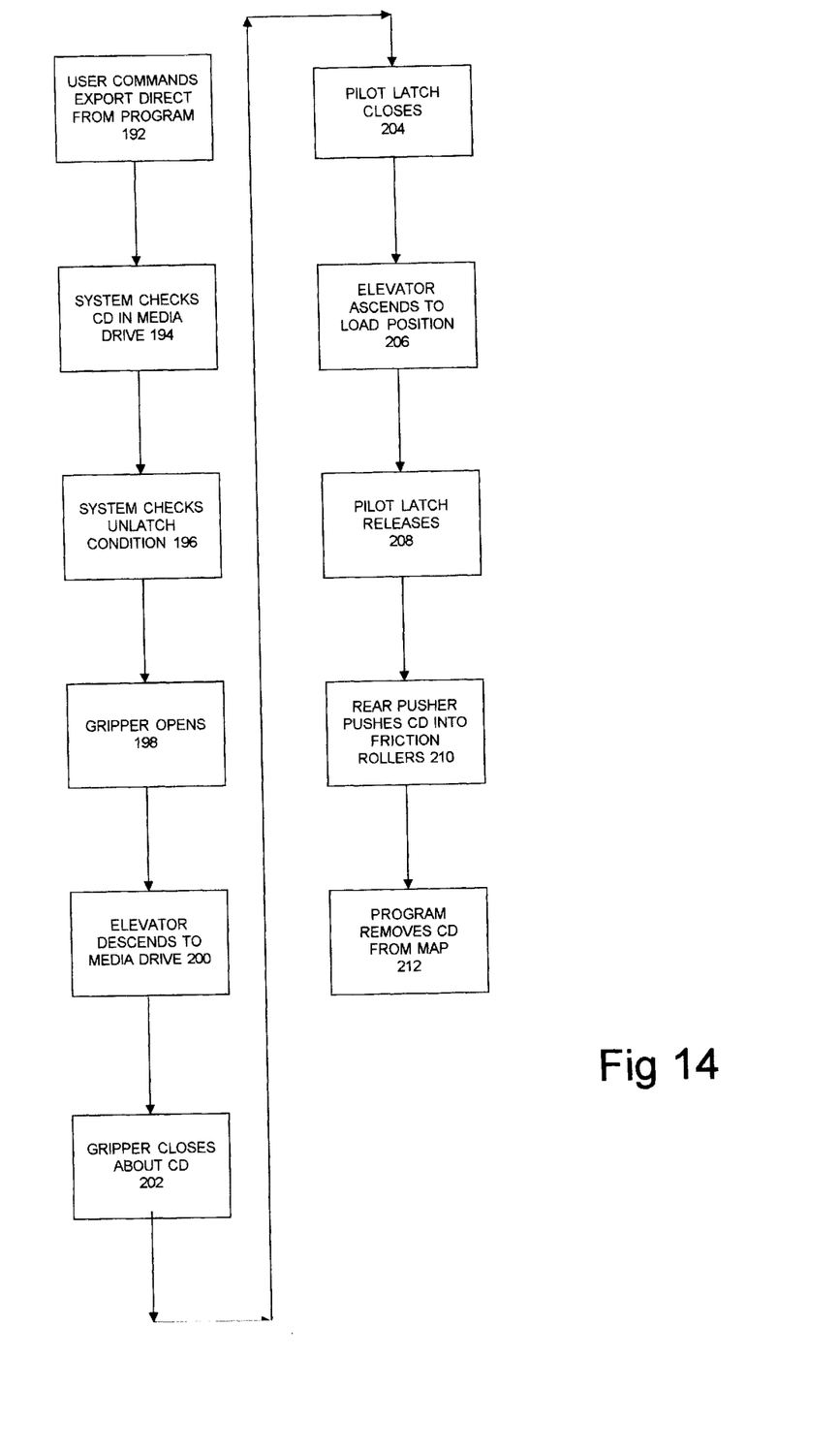
FIG. 14 depicts the flow chart of the operations involved in the EXPORT DIRECT of a CD from the system.

The sequence of operations for EXPORT DIRECT is shown by the flow chart of FIG. 14, and functions as follows:

a) The user commands an EXPORT DIRECT operation from the control program 192.

b) The control program checks to see that there is a CD loaded into the Media drive 194.

c) The system checks to see that the latching mechanism is in the unlatch position 196.

d) The cheeks of the gripper open 198.

e) The elevator mechanism moves until the front gripper mechanism reaches a position just above the Media drive 200.

f) The gripper closes about the CD, gripping the CD by its edges 202.

g) The pilot latch closes into its latch position, holding the CD firmly in place 204.

h) The gripper ascends with the elevator mechanism to the level of the LOAD position adjacent to the port 206.

i) The pilot latch releases 208.

j) The rear pusher mechanism pushes the CD out of the gripper and into the friction rollers, which expel the CD into the port 210.

k) The control program removes the CD from the control map, and marks the Media drive available 212.

Similarly to the other sequences it is not essential that the sequence of EXPORT DIRECT conform exactly to the list above in other embodiments, but it is essential that 1. The export direct command is the first step;

2. The checking of the latching mechanism must precede the movement of the elevator mechanism to the Media drive; and 3. The movement of the elevator mechanism to the Media drive, the gripping of the CD by the gripper, the latching of the pilot latch, the ascent of the elevator mechanism to the LOAD position, and the pushing of the CD out of the gripper into the friction rollers must proceed in the order indicated.

Once a portion of the CD is visible in the port the user may then remove the CD manually.

While the invention has been described with reference to specific embodiments, it will be apparent that improvements and modifications may be made within the purview of the invention without departing from the scope of the invention defined in the appended claims.

I claim:

1. A drive system for inputting, storing, retrieving, and playing a multiplicity of compact disks, used in conjunction with a media drive having, a media which opens and closes tray and with a computer having input and output signals, comprising the following mechanical elements:

a magazine containing, a multiplicity of compact disk storage slots in which the compact disks are stored;

a compact disk input port, through which the compact disks enter and leave the system;

an elevator system traversing the magazine, having a calibration point, having a multiplicity of limits, and having limit detectors for detecting each limit;

a compact disk gripper affixed to the elevator system, the gripper holding the compact disks while they are within the system, but not in the magazine, the gripper further comprising:

a top plate which moves along the magazine in concert with the elevator system;

two gripper cheeks rotatably mounted to the top plate, each gripper cheek containing a groove into which an edge of a compact disk fits; and two solenoids, each mechanically connected to a separate cheek the solenoids having two positions, holding the compact disk in one position and releasing the compact disk in the other position, means for drawing the compact disk from the input port in to the gripper;

a front and rear pusher, each having a multiplicity of positions, each attached to the elevator system, the font pusher pushing the compact disk into the magazine from the gripper, the rear pusher pushing the compact disk from the magazine into the grippers, and each pusher further comprising:

a rotating electric motor;

an arm which engages the compact disk; and means for converting rotational motion of the electric motor into reciprocating motion of the arm, the drive system further comprising:

a computer program running on the computer, the program coordinating the operation of the various mechanical elements of the system;

a front and rear pusher detectors which generate electrical signals in response to the sensing of each position of the front and rear pushers, and an electronic subsystem which converts output signals from the computer into signals to the solenoids and the mechanical elements of the drive system, and which converts signals from all the detectors into input signals to the computer.

2. The drive system of claim 1, further comprising a position encoder to accurately locate the position of the elevator system relative to the magazine, whereby the output signal from the position encoder further comprises signals fed to the computer via the electronic subsystem.

3. The drive system of claim 2, whereby the magazine further comprises two parallel sides with slots approximately the width of a compact disk in each side, the slots of one side facing the slots of the other side, whereby the compact disks are supported in close proximity to each other within said magazine.

4. The system of claim 1, wherein the mechanical elements further comprise a pilot latch affixed to the gripper, the pilot latch having latched and unlatched positions, and wherein a pilot latch detector generates electrical signals in response to the sensing of each position of the pilot latch.

5. The drive system of claim 4, further comprising a position encoder to accurately locate the position of the elevator elevator relative to the magazine, whereby the output signal from the position encoder further comprises signals fed to the computer via the electronic subsystem.

6. The drive system of claim 5, whereby the magazine further comprises two parallel sides with slots approximately the width of a compact disk in each side, the slots of one side facing the slots of the other side, whereby the compact disks may be supported in close proximity to each other within said magazine.

7. A method for controlling the drive system comprising the elements recited in claim 4, comprising:

identifying the compact disks with a unique identification title;

maintaining a location map correlating the title of each compact disk with a corresponding slot in which the compact disk is stored; and controlling the insertion or removal of a compact disk in a specified slot by means of said identification title.

8. The method for controlling the drive system recited in claim 7, said method further comprising the steps, in order, as follows:

a) requesting a command by the program;
b) inputting an "import" command by a user;
c) selecting the next available storage slot by the program by means of searching the location map;
d) requesting the user for a title;
e) inputting a title by the user and storing it in the location map;
f) checking by the computer that the pilot latch is in the unlatched position;
g) driving the elevator system to the input port;
h) inserting the compact disk into the input port by the user;
i) drawing the compact disk into the input port;
j) pushing the compact disk into the gripper by means of the front pusher arm;
k) closing the pilot latch into its latched position thereby; holding the compact disk firmly in place;
l) descending the elevator system until the gripper aligns with the selected storage slot in the magazine;
m) releasing the pilot latch to its unlatched position; and
n) pushing the compact disk into the magazine by means of the front pusher arm.

9. The method recited in claim 7, said method further comprising the steps, in order, as follows:

a) requesting a command by the program;
b) inputting an "import direct" command by a user;
c) determining whether the media drive is available by means of searching the location map;
d) requesting the user for a title;
e) inputting a title by the user and storing it in the location map;
f) checking by the computer that the pilot latch is in the unlatched position;
g) driving the elevator system to the input port;
h) inserting the compact disk into the input port by the user;
i) drawing the compact disk into the input port;
j) pushing the compact disk into the gripper by means of the front pusher arm;
k) closing the pilot latch into its latched position thereby holding the compact disk firmly in place;
l) descending the elevator system until it is in its closes proximity to, and above the media drive;
m) releasing the pilot latch to its unlatched position;
n) opening the media drive tray;
o) opening the gripper to release the compact disk; and
p) closing the media drive tray.

10. The method recited in claim 7, said method further comprising the steps, in order, as follows;

a) requesting a command by the program;
b) inputting an "export" command by a user;
c) requesting the user for a title;
d) inputting a title by the user and removing it from the location map;
e) checking by the computer that the pilot latch is in the unlatched position;
f) driving the elevator system to the slot containing the requested title;
g) pushing the compact disk from said slot into the gripper;
h) closing the pilot latch into its latched position thereby holding the compact disk firmly in place;
i) driving the elevator system to the input port;
j) releasing the pilot latch to its unlatched position;
k) pushing the compact disk into the input port; and
l) expelling the compact disk from the input port.

11. The method recited in claim 7, said method further comprising the steps, in order, as follows:

a) requesting a command by the program;
b) inputting an "export direct" command by a user;
c) checking that the compact disk is in the media drive;
d) checking that the pilot latch is in the unlatched position;
e) opening the gripper;
f) descending the elevator system until it is in its closes proximity to, and above the media drive;
g) closing the gripper about the compact disk;
h) closing the pilot latch into its latched position thereby holding the compact disk firmly in place;
i) driving the elevator system to the input port;
j) releasing the pilot latch to its unlatched position;
k) pushing the compact disk into the input port; and
l) expelling the compact disk from the input port.

* * * * *